Dec. 9, 1930.  H. FORD  1,784,624
GENERATOR
Filed Nov. 26, 1928
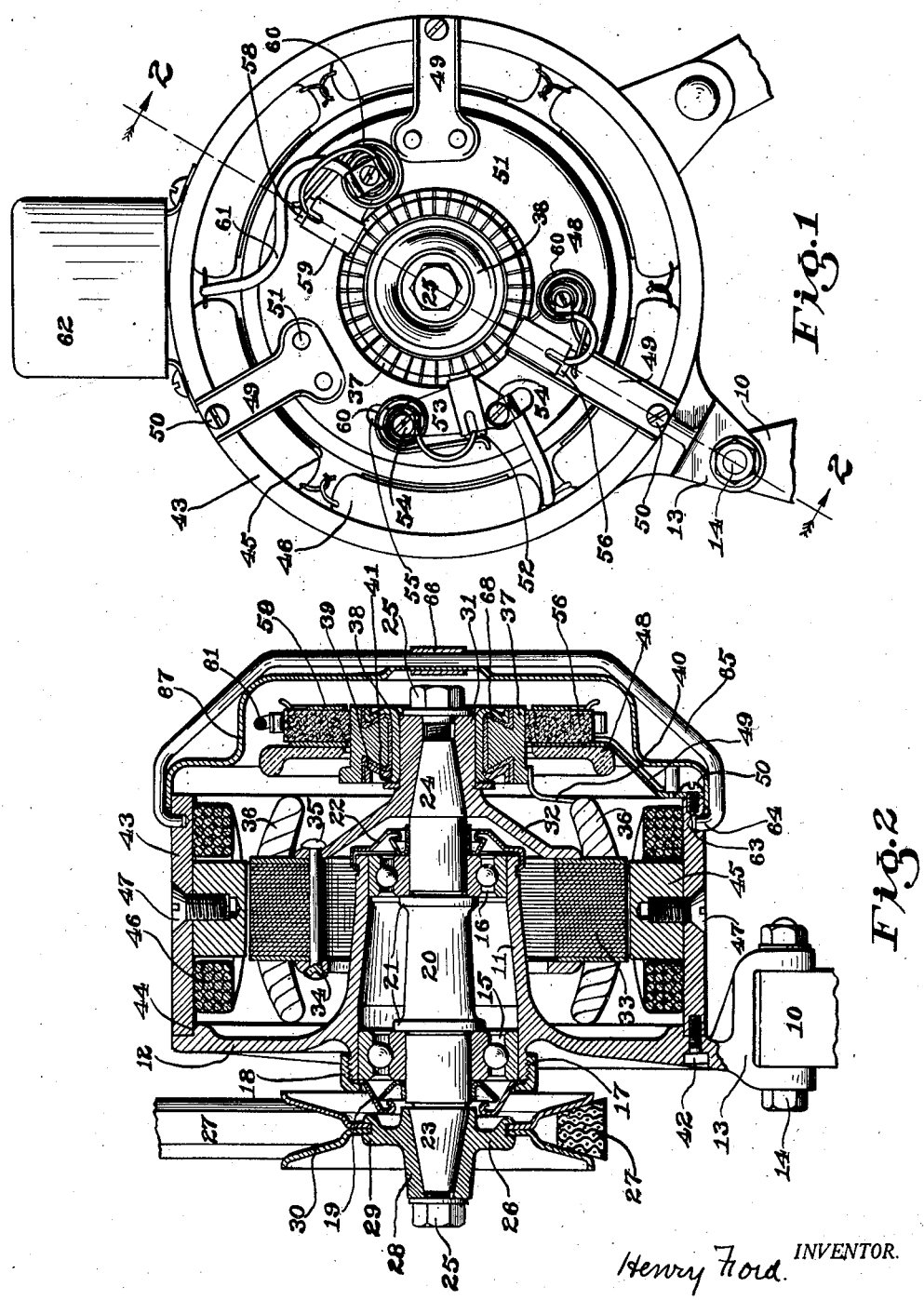
INVENTOR.
Henry Ford.
BY C. R. Halbert.
E. L. Davis.
ATTORNEYS.

Patented Dec. 9, 1930

1,784,624

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

GENERATOR

Application filed November 26, 1928. Serial No. 321,795.

The object of my invention is to provide a generator of simple, durable, and inexpensive construction.

A further object of my invention is to provide a generator with a barrel shaped grease reservoir therein, an armature drive shaft rotatably mounted in said reservoir and extended therethrough, grease retainers forming the ends of said reservoir, a drive pulley mounted on one end of the armature drive shaft and a bell shaped armature mounted on the other end of the drive shaft.

Still a further object of my invention is to provide a generator which insures that the armature shaft bearings will always be aligned with each other. Heretofore generators, especially those used with automobile engines, have been constructed with a bearing on each end of the armature shaft. In this type of generator a number of joints or flanges in the housing, connecting the two bearings, must be accurately aligned to insure an accurate alignment of the armature bearings and this alignment is difficult to secure and retain.

Still a further object of my invention is to provide a generator, in which the armature shaft bearings are relatively permanently inclosed in a grease reservoir, and which maintains the field pole pieces and the armature concentric, thereby allowing the practical use of a much smaller air gap therebetween to materially increase the electrical efficiency of the generator.

Still a further object of my invention is to provide a generator, in which the armature is of a relatively large diameter and very short to thereby require only a static balance; the static balancing operation automatically securing dynamic balance in the armature. The wire wound high speed automobile type armatures which are of about an equal length and diameter require both static and dynamic balancing to secure vibrationless operation, and to place such an armature in dynamic balance requires a high degree of skill and considerable time. My improved armature being of very short length in comparison to its diameter requires only to be placed in static balance to secure commercial dynamic balance therein.

Still a further object of my invention is to provide a generator, in which the commutator is of a simplified design, eliminating many of the parts and machine operations formerly necessary in making a commutator.

Still a further object of my invention is to provide a generator, in which it is impossible for lubricant to be thrown on the commutator thereby ruining the carbon brushes used therewith. One of the frequent causes of generator failure is that the commutator brushes become oil soaked and soon wear or crumble to small pieces. It has heretofore been practically impossible, when a bearing is placed at the outer end of the commutator, to keep the bearing lubricant from being thrown out by the revolving armature onto the brushes.

Still a further object of my invention is to provide a brush ring of insulating material, so that insulating of screws, rivets, sockets, and the like therefrom, is unnecessary.

Still a further object of my invention is to provide a generator, having a dust proof cover inclosing the commutator and the brushes, the cover being readily removable for inspection or adjustment of the generator.

With these and other objects in view my invention consists in the arrangement, construction, and combination of the various parts of my improved device, as described in the specification, claimed in the claim, and illustrated in the accompanying drawings, in which Figure 1 shows an elevation of the rear end of the device the cover being removed to better illustrate the construction.

Figure 2 shows a sectional view taken on line 2—2 of Figure 1.

Referring to the accompanying drawings, I have used the reference numeral 10 to indicate generally a bracket formed on the crankcase of an automobile engine. A sleeve 11, having an annular radial flange 12 near its outer end, forms the front cover plate and bearing housing for my generator. The lower edge of the flange 12 terminates in a forked bracket 13, which is secured onto the bracket 10 by a bolt 14. A front armature shaft bearing 15 is mounted adjacent to the front end of sleeve 11, and a similar rear armature shaft bearing 16 is mounted in the sleeve 11 adjacent to its rear end.

An exterior thread 17 is cut on the exterior of the front end of the sleeve 11 in front of and adjacent to flange 12. A gland nut 18 co-acts with threads 17 to secure thereto the outer or stationary part of a grease retainer 19 of the oil throwing type.

A generator drive shaft 20 is rotatably mounted in the ball bearings 15 and 16. A pair of shoulders 21 are provided on shaft 20 to space the bearings 15 and 16 a predetermined distance apart, and also to carry any end thrust which may be applied to the armature shaft, to the bearings 15 and 16. The inner or rotating part of the grease retainer 19 is mounted near the front end of shaft 20 adjacent to bearing 15. A rear grease retainer 22, similar to and mounted the same as the retainer 19, is secured near the rear end of the shaft 20 and the sleeve 11.

The front and rear ends of the shaft 20 are tapered as at 23 and 24, respectively, and project outwardly through the grease retainers 19 and 22. Each end of the shaft 20 has a threaded hole therein which receives a cap screw 25.

From the foregoing, it may be seen that I have provided an armature shaft rotatably mounted in a sleeve, and have provided grease retainers for closing the ends of said sleeve. A large quantity of lubricant may be stored in the barrel shaped reservoir so formed for the continuous lubrication of the shaft bearings therein.

A drive pulley 26 is secured to the tapered front end of the shaft 20 by the cap screw 25 and is driven by a belt 27 which, of course, would be driven by a suitable pulley (not shown) on the engine. The pulley 26 consists of a hub member 28, having a radial annular flange 29 extending therefrom, and having a tapered hole axially disposed therein to co-act with the tapered end 23 of the shaft 20. Two identical cone shaped pulley sides are secured to the rim of flange 29 by spinning a shoulder from said rim, to secure an annular U shaped clamp around the adjacent inner edges of the cone shaped members 30. As may be seen, a pulley of very light and sturdy construction for use with a V type belt has been described but, although this is a highly desirable construction to use, any other type of drive may be used.

An armature hub 31 is secured to the rear tapered end 24 of the shaft 20 in the same manner as the pulley 26 is secured to the forward end 23 of the shaft 20. A cone shaped flange 32 extends outwardly and forwardly from the front end of the hub 31 to form a carrier for the armature laminations 33, which are clamped thereto by a clamping ring 34 and rivets 35. An annular laminated armature sleeve is thus formed. Suitable slots are formed in the exterior edges of the laminations 33 to receive conventional armature coils 36.

A peripheral type of commutator is rigidly mounted upon the rear end of the hub 31. This commutator is built up of a plurality of segments, clamped together to form a composite annulus. The segments or conductor bars 37 are insulated from one another and from their mounting by sheets of mica 68. They are clamped between the radial flange of the mounting ring 38 and a clamping ring 39. Each segment or bar 37 may be provided with a conductor 40 for connecting it to the armature winding 36. A rigid commutator assembly is secured by flanging a shoulder 41 on the collar 38 over the clamping ring 39 and then pressing the assembled armature onto the hub 31.

A plurality of screws 42 secure the flange 12 to an annular field ring 43. An annular shoulder 44 on the flange 12 forms a pilot to secure an accurate alignment of these two parts. Six field pole pieces 45 are equally spaced around and extend inwardly from the inside of the ring 42 to position very close to the armature laminations 33. Field coils 46 are mounted on these pole pieces 45 and are connected in series to form the generator field winding.

Screws 47 secure the pole pieces 45 to the ring 43. An accurate alignment is always maintained between the armature and the field pole pieces, due to the one piece armature bearing housing, consequently, I am enabled to reduce the gap ordinarily necessary between the armature and the field pole pieces and thereby increase the electrical efficiency of the generator. It may also be seen that any lubricant which may be thrown out through the grease retainer 22 will strike the forward side of the armature and will be thrown to the field ring, the rear side of the armature upon which the commutator is mounted remaining totally free from oil or grease.

A brush carrying ring 48 of insulating material, such as bakelite or fiber, surrounds the commutator and has a flat face on its rear side extending radially from the said commutator. Three supporting arms 49 secure the brush carrying ring 48 in axial alignment with the armature by means of screws 50 and rivets 51. Two of the arms 49 are used for supporting the ring only, while the third arm is used for supporting the ring and also to form a ground terminal for one of the brushes.

The third brush system of current regulation, now almost universally used for small generators, is employed here. A regulating third brush 52 is slidably mounted in a brush holder 53 which is secured onto the ring 48 by screws 54. An arcuate slot 55 is provided in the periphery of brush carrying ring 48 to allow the brush holder 53 a limited amount of concentric angular movement whereby the adjustment of the regulating brush 52 is obtained.

The grounded brush 56 is slidably mounted in a brush carrier 57 formed integral with the supporting arm 49. A current take-off brush 58 is slidably secured in a brush holder 59 which is rigidly mounted diametrically opposite the ground brush on the ring 48. Suitable helical coil springs 60 are secured on each of the brush holders to urge the brushes against the commutator sections. A suitable conductor 61 connects the brush 58 with a cut-out relay 62 of the conventional type which is used with the generator.

From the foregoing it may be seen that I have used a brush carrying ring in which the insulating of the screws, rivets, brackets and the like therefrom, is unnecessary. A pair of diametrically opposed bail receiving recesses 63 are drilled in the outer edge of the field ring 43 adjacent to its rear side to receive the inturned ends 64 of the bail 65. A clip 66 rotatably secures the center section of the bail 65 to a dished shaped protecting cover 67, which fits down over the outer rear edge of field ring 43 and forms a closure for the rear end of the generator. The cover member 67 may be readily removed by springing one of the inturned ends 64 of the bail 65 out of its recess 63. The brushes, armature, and commutator may then be inspected or replaced and the generator put in operation before replacing the cover. By being able to adjust the brushes while the generator is in operation, sparkless commutation and the desired charging rate are easily obtained.

As will be seen I have used six field pole pieces in my improved generator. Although I am aware that other generators have been made using this same number of field pole pieces, this arrangement has fallen into disuse due to the small diameter of the armatures used and the heretofore expensive construction necessary to increase the armature diameter sufficiently, and still maintain a suitable bearing alignment for the armature shaft bearings. Due to the bearings of my improved generator being in a relatively small sleeve and being on only one end of the armature, I am enabled to use a large diameter armature with a greater number of poles, thereby reducing the flux density in the poles and also securing an output voltage having a considerably less variation than is normally obtained. This is a very desirable result when the current generated is used to charge a storage battery, as it lengthens the life of the battery considerably.

Among the many advantages arising from the use of my improved generator, it may be well to point out that I have secured a generator, which has bearings permanently aligned and constantly lubricated from a relatively large reservoir contained therein and in which the bearings are located so that the lubricant thrown out from the armature shaft will not be deposited on the commutator or the brushes of the generator. I have also provided an armature which can readily be put in dynamic balance and one with which a very small air gap between it and the field pole pieces can readily be maintained. A further advantage arises because I am enabled to adjust, inspect or install new commutator brushes without disturbing or impairing the armature bearings in any way. I also provide a brush carrier ring from which the brush holders need not be insulated and one with which no insulating washers or the like are used. A further advantage arises because the variation of voltage produced with my improved generator is considerably less than heretofore has been obtained, resulting in the prolongation of the life of the battery used therewith.

Some changes may be made in the arrangement and construction of the various parts of my improved device without departing from the spirit of my invention, and it is my intention to cover by my claim such changes as may reasonably be included within the scope thereof.

I claim as my invention:

In a device of the character described, a sleeve, an annular flange extending radially from said sleeve near one end thereof, a cylindrical generator shell mounted on the said flange, pole members mounted within said shell, a shaft extended through said sleeve and journalled therein, an armature of bell shape mounted on the rear end of said shaft and extended to position to receive a portion of said sleeve and to co-act with said pole members, a commutator ring mounted on said armature, a brush ring mounted on said shell, a plurality of brush members mounted on said brush ring in position to co-act with said commutator, a quick detachable cover for said shell adapted to receive and enclose said commutator and brush assemblies, and driving means secured to the other end of said shaft.

October 26, 1928.

HENRY FORD.